(12) United States Patent
Turner et al.

(10) Patent No.: US 12,319,258 B2
(45) Date of Patent: Jun. 3, 2025

(54) POSITIVE PRESSURE CHOCK SYSTEM (71) Applicants: Jamus Turner, Edmonton (CA); Jamal Issawi, Edmonton (CA)

(72) Inventors: Jamus Turner, Edmonton (CA); Jamal Issawi, Edmonton (CA)

( * ) Notice: Subject to any disclaimer, the term of this patent is extended or adjusted under 35 U.S.C. 154(b) by 385 days.

(21) Appl. No.: 17/865,458

(22) Filed: Jul. 15, 2022

(65) Prior Publication Data

US 2023/0014824 A1 Jan. 19, 2023

(30) Foreign Application Priority Data

Jul. 16, 2021 (CA) ................................ CA 3124859

(51) Int. Cl.
*B60T 3/00* (2006.01)
(52) U.S. Cl.
CPC ...................................... *B60T 3/00* (2013.01)
(58) Field of Classification Search
CPC ........................................................ B60T 3/00
See application file for complete search history.

(56) References Cited

U.S. PATENT DOCUMENTS

| | | | |
|---|---|---|---|
| 2,720,285 A | 10/1955 | Taylor | |
| 2,771,162 A | 11/1956 | Marsh | |
| 3,258,088 A | 6/1966 | Bowen | |
| 3,317,006 A | 5/1967 | Patterson | |
| 4,711,325 A | 12/1987 | Mountz | |
| 5,664,930 A | 9/1997 | Ellis | |
| 6,378,956 B1 | 4/2002 | Van De Walker | |
| 6,948,593 B2 | 9/2005 | Horton | |
| 7,753,177 B2 | 7/2010 | Slager | |
| 8,443,945 B2 | 5/2013 | Perkins | |
| 9,592,760 B2 | 3/2017 | Anderson et al. | |
| 10,793,119 B2 | 10/2020 | Jette et al. | |
| 2004/0108172 A1 | 6/2004 | Fox | |
| 2004/0120784 A1 | 6/2004 | Sargent | |
| 2008/0073162 A1* | 3/2008 | Scott | B60T 3/00 188/32 |
| 2014/0188334 A1 | 7/2014 | Foster | |
| 2019/0202418 A1* | 7/2019 | Waddell | B60T 3/00 |

FOREIGN PATENT DOCUMENTS

| | | | |
|---|---|---|---|
| CN | 212195412 | * | 12/2020 |
| WO | WO 2010/118768 | * | 10/2010 |

* cited by examiner

*Primary Examiner* — Pamela Rodriguez
(74) *Attorney, Agent, or Firm* — Finch & Maloney PLLC (57) ABSTRACT

A positive pressure chock system has a first arm with a first wheel chock and a second arm with a second wheel chock. The first wheel chock is attached at a bottom end of the first arm and the second wheel chock is positioned at a bottom end of the second arm. The first arm and the second arm are attached at a hinge point such that the first wheel chock and the second wheel chock are movable between an open position where the first wheel chock and the second wheel chock move away from each other and a closed position in which the first wheel chock is biased towards the second wheel chock.

16 Claims, 7 Drawing Sheets

POSITIVE PRESSURE CHOCK SYSTEM

FIELD OF THE DISCLOSURE

The present application relates generally to a wheel chock, more particularly it relates to a positive pressure wheel chock.

BACKGROUND

This section provides background information to facilitate a better understanding of the various aspects of the invention. It should be understood that the statements in this section of this document are to be read in this light, and not as admissions of prior art.

Wheel chocks are used to prevent accidental movement of a vehicle in many situations such as during maintenance or when parked on a hill. It is also common to use wheel chocks on trailers, particularly when unhitched to prevent accidental movement. In some circumstances, wheel chocks are awkward to place, requiring the user to lean over or rest on the balls of their feet or knees. An improperly placed wheel chock will also fail to prevent movement if it slides out of position or simply moves with the tire. This can result in otherwise avoidable injuries.

BRIEF SUMMARY

There is provided a positive pressure chock system. A first arm having a first wheel chock is provided. The first wheel chock is attached at a bottom end of the first arm. A second arm having a second wheel chock is provided. The second wheel chock is attached to a bottom end of the second arm. The first arm and the second arm are attached at a hinge point such that the first wheel chock and the second wheel chock are movable between an open position where the first wheel chock and the second wheel chock move away from each other and a closed position wherein the first wheel chock is biased towards the second wheel chock.

In one embodiment, the first arm and the second arm extend beyond the hinge point such that a second end of the first arm and a second end of the second arm are positioned above the hinge point.

In one embodiment, a locking mechanism is provided for holding the first wheel chock and the second wheel chock in the open position.

In one embodiment, the locking mechanism includes a lock pin and a lock pin aperture. The lock pin aperture has a size that corresponds to a size of the lock pin. The lock pin aperture is positioned on one of the first arm or the second arm and the lock pin is positioned on the other of the first arm or the second arm. The lock pin and the lock pin aperture are aligned when the first wheel chock and the second wheel chock are in the open position.

In one embodiment, the lock pin is biased towards a locking position by a spring. The lock pin is movable to the unlocking position by a lock handle.

In one embodiment, the lock handle is attached to the lock pin by a lock pin rod.

In one embodiment, the lock pin aperture and the lock pin are positioned adjacent the hinge point.

In one embodiment, a stop pin is provided to limit the distance between the first wheel chock and the second wheel chock when in the open position.

In one embodiment, the first arm has a first handle. The first handle extends from the second end of the first arm.

In another embodiment, the second arm has a second handle. The second handle extends from the second end of the second arm.

In one embodiment, the first wheel chock is biased towards the second wheel chock by a stretch connector attached to the first arm and the second arm. The stretch connector may be surgical tubing, a rubber band, a metal spring, or any other suitable item known to a person skilled in the art.

In one embodiment, at least one wheel chock position pin is positioned adjacent to each of the first wheel chock and the second wheel chock. The wheel chock position pins limit the rotational movement of the first wheel chock and the second wheel chock by acting as stops. Rotation may be limited in one or two directions.

In one embodiment, a first wheel is positioned adjacent the bottom end of the first arm and a second wheel is positioned adjacent the bottom end of the second arm to aid in transport of the positive pressure chock system.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

A positive pressure chock system, generally identified by reference numeral 10, will now be described with reference to FIG. 1 through FIG. 8.

Figure 1:
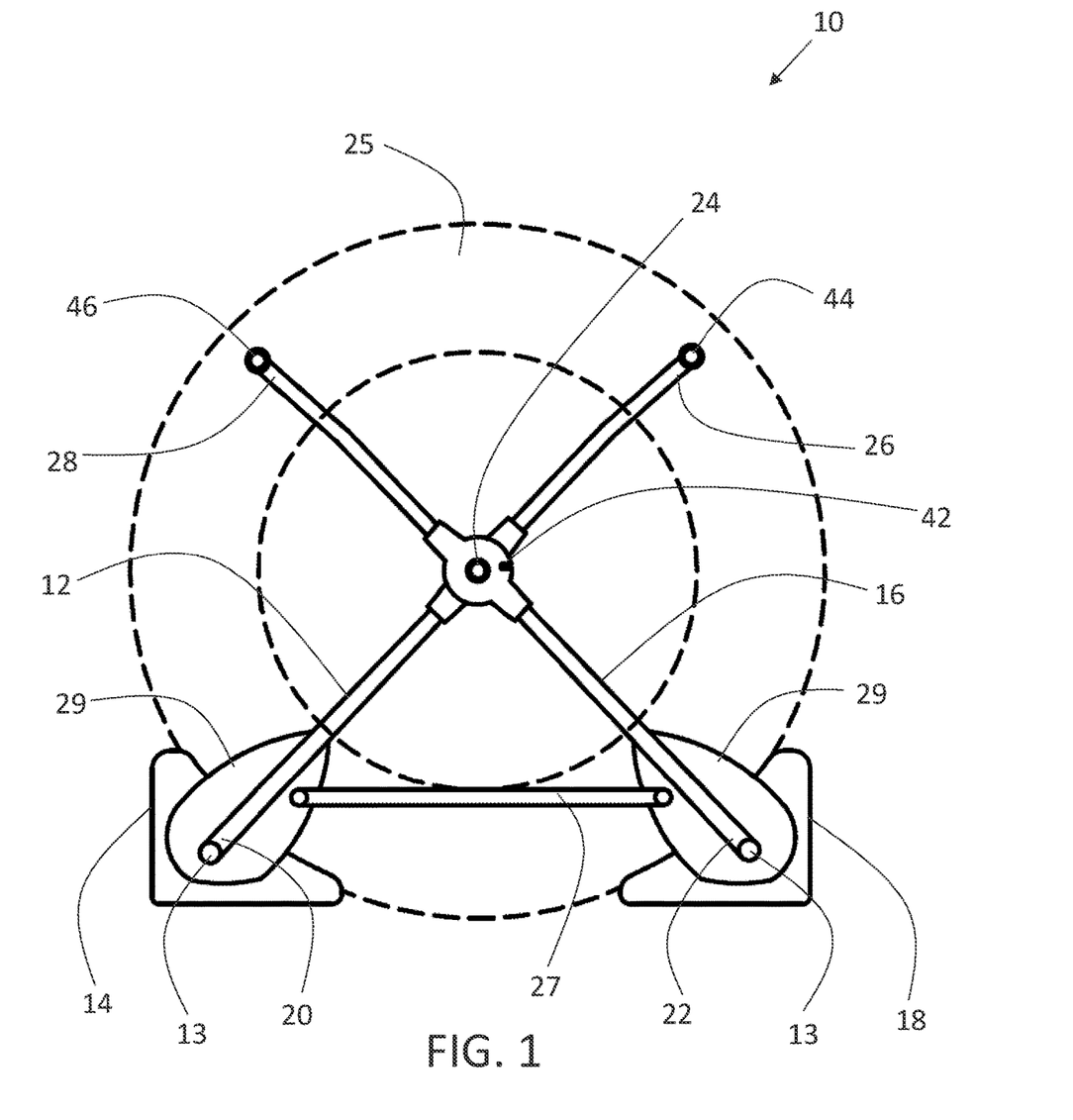
FIG. 1 is a front elevation view of a positive pressure wheel chock.
Figure 2:
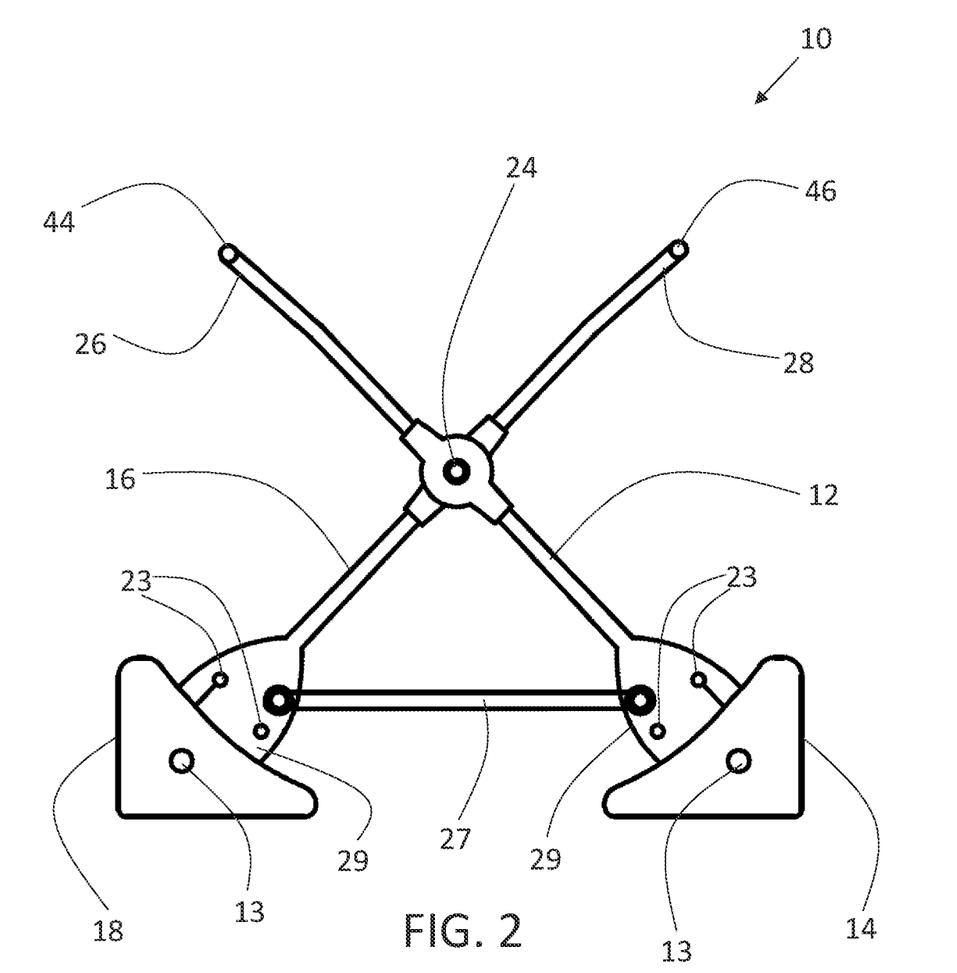
FIG. 2 is a rear elevation view of the positive pressure wheel chock.
Figure 3:
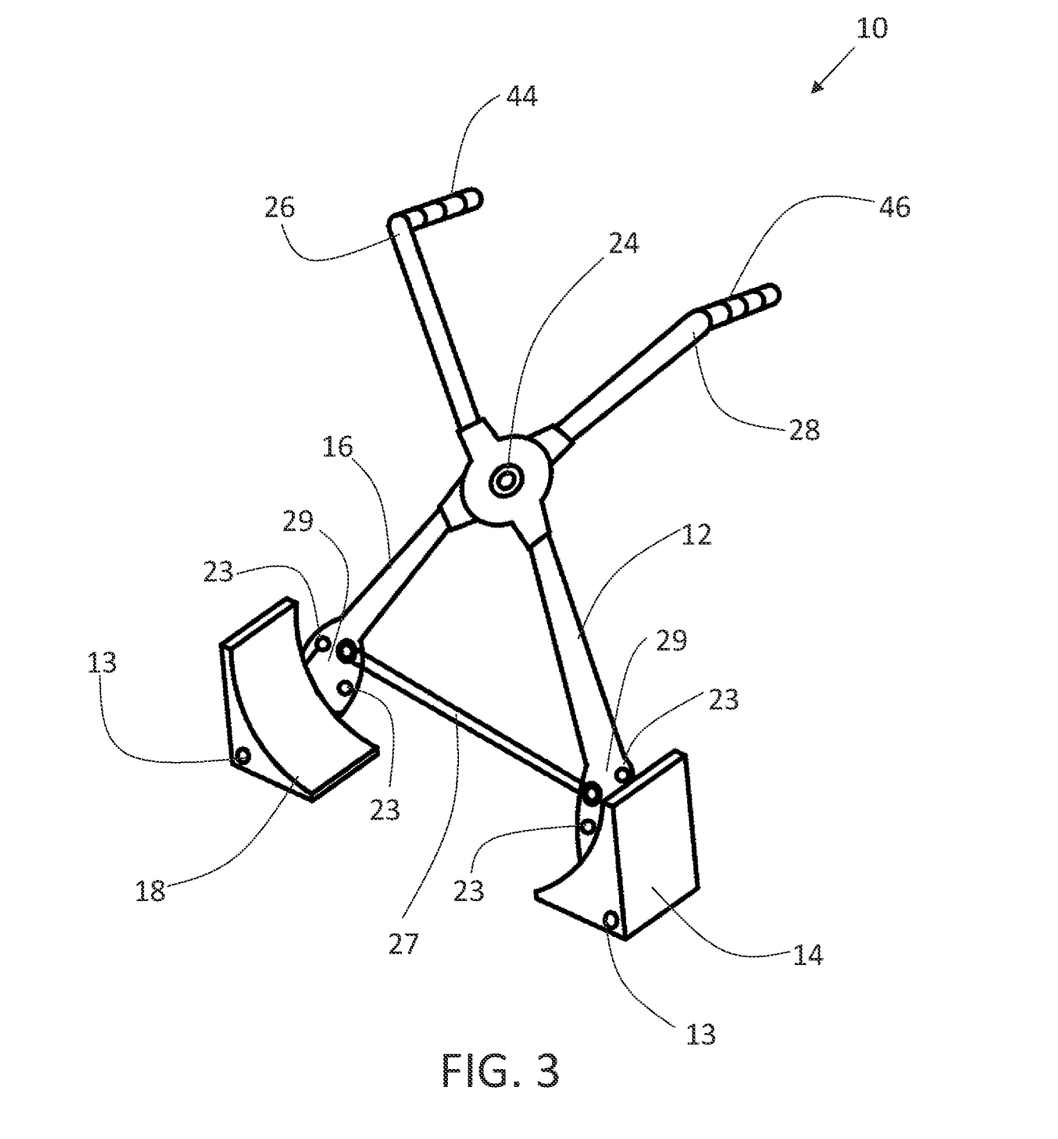
FIG. 3 is a perspective view of the positive pressure wheel chock.

Referring to FIG. 3, a positive pressure chock system 10 has a first arm 12 with a first wheel chock 14 and a second arm 16 with a second wheel chock 18. Referring to FIG. 1, first wheel chock 14 is positioned at a bottom end 20 of first arm 12. First wheel chock 14 may be attached to first arm 12 using a bolt 13 or any other suitable method known to a person skilled in the art. Second wheel chock 18 is positioned at a bottom end 22 of second arm 16. Second wheel chock 18 may be attached to second arm 16 using a bolt 13 or any other suitable method known to a person skilled in the art. First wheel chock 14 and second wheel chock 18 may be fixedly attached at bottom ends 20 and 22, respectively to prevent rotation if first wheel chock 14 and second wheel chock 18 relative to bottom ends 20 and 22 or may be attached at bottom ends 20 and 22 to allow rotation of first wheel chock 14 and second wheel chock 18 relative to bottom ends 20 and 22. As would be understood by a person skilled in the art, first wheel chock 14 and second wheel chock 18 are wedge shaped and mirror images of each other such that the inclined planes of first wheel chock 14 and second wheel chock 18 are capable of contacting the same tire 25. The inclined planes may be concave to provide a greater area of contact between tire 25 and each of first wheel chock 14 and second wheel chock 18. Referring to FIG. 2, when first wheel chock 14 and second wheel chock 18 are attached such that they are allowed to rotate, wheel chock position pin 23 may be used to limit the range of rotation by acting as stops. Preferably, a pair of wheel chock position pins 23 are used for each of first wheel chock 14 and second wheel chock 18. When a pair of wheel chock position pins 23 is used, they can be used to limit rotation in both a first direction and a second direction. In scenarios where it is only important to limit rotation in a single direction, a single wheel chock position pin 23 may be used. By altering the positioning of wheel chock position pins 23, the amount of allowable rotation may be varied.

First arm 12 and second arm 16 are attached at a hinge point 24 such that first wheel chock 14 and second wheel chock 18 are movable between an open position and a closed position. In the open position, first wheel chock 14 and second wheel chock 18 move away from each other. This allows first wheel chock 14 and second wheel chock 18 to be spaced apart from each other to allow them to be positioned on either side of a tire 25, shown in FIG. 1. Referring to FIG. 2 in the closed position, first wheel chock 14 is biased towards second wheel chock 18. First wheel chock 14 is biased towards second wheel chock 18 using a stretch connector 27. Stretch connector 27 may be surgical tubing, rubber band, metal spring, or any other suitable material known to a person skilled in the art. If a metal spring is used, it may be covered by a tube to protect the user from being pinched. In the embodiments shown, stretch connector 27 is positioned on a mounting plate 29 that is used to attach first wheel chock 14 and second wheel chock 18 to first arm 12 and second arm 16, respectively. It will be understood by a person skilled in the art that stretch connector 27 may be attached to first arm 12 and second arm 16 or to first wheel chock 14 and second wheel chock 18. Referring to FIG. 1, when chock system 10 is in use, both first wheel chock 14 and second wheel chock 18 contact tire 25 and apply pressure to tire 25. Generally, the closed position will place first wheel chock 14 and second wheel chock 18 in closer proximity to each other than the expected distance when positioned on a tire. This results in pressure being applied to tire 25 as biased first wheel chock 14 and second wheel chock 18 continue to be biased towards each other.

Figure 5:
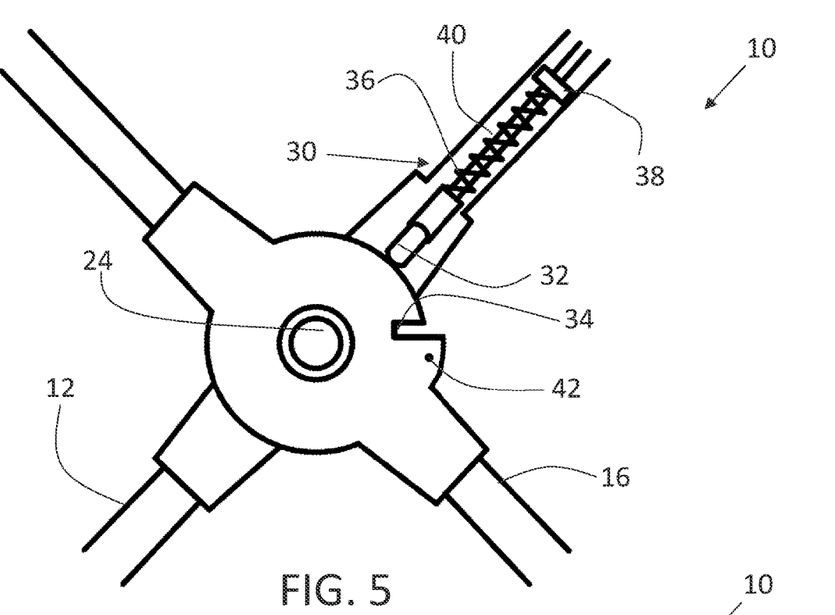
FIG. 5 is a detailed view of a locking mechanism in the unlocked position.
Figure 6:
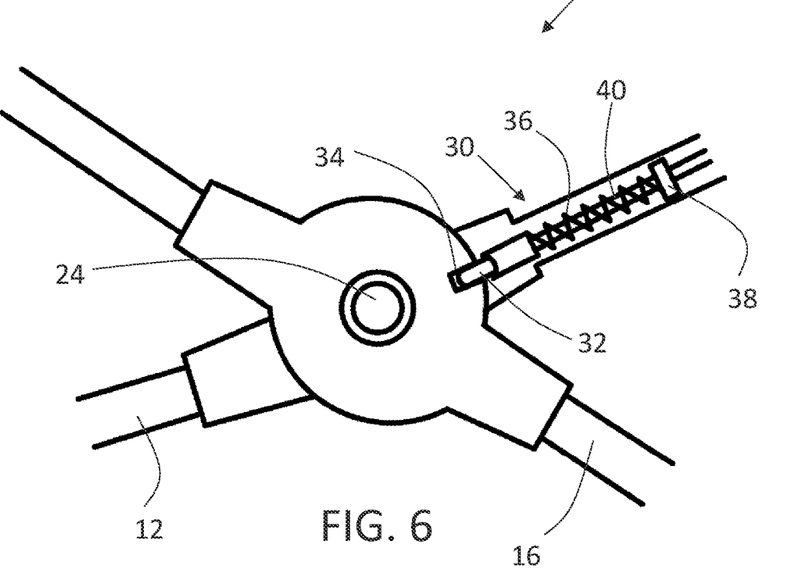
FIG. 6 is a detailed view of the locking mechanism shown in FIG. 5 in the locked position.

In the embodiment shown in FIG. 2, first arm 12 and second arm 16 extend beyond hinge point 24 such that a second end 26 of first arm 12 and a second end 28 of second arm 16 are positioned above hinge point 24. Referring to FIG. 5 and FIG. 6, a locking mechanism 30 is provided for holding first wheel chock 14 and second wheel chock 18 in the open position. This allows a user to maintain the open position without effort. It will be understood by a person skilled in the art that locking mechanism 30 may be any appropriate mechanism known to a person skilled in the art. This may include, but is not limited to, a wire loop to hold second end 26 or 28 to bottom end 22 or 20, respectively, a tie, a carabiner and corresponding aperture, or a lock pin and corresponding lock pin aperture. In the embodiment shown in FIG. 5 and FIG. 6, a lock pin 32 and corresponding lock pin aperture 34 is shown. Lock pin aperture 34 has a size that corresponds to a size of lock pin 32 such that lock pin 32 can slide into and out of lock pin aperture 34. Lock pin aperture 34 is positioned on one of first arm 12 or second arm 16. Lock pin 32 is positioned on the other of first arm 12 or second arm 16 such that lock pin 32 and lock pin aperture 34 are on opposing arms. Lock pin 32 and lock pin aperture 34 become aligned when first wheel chock 14 and second wheel chock 18 are in the open position. In one embodiment, lock pin 32 is biased towards a locking position by a spring 36. This causes lock pin 32 to automatically slide into lock pin aperture 34 into a locked position, shown in FIG. 6, when aligned. Lock pin 32 may be movable to an unlocking position, shown in FIG. 5, utilizing a lock handle 38. In the embodiment shown, lock handle 38 is attached to lock pin by a lock pin rod 40. It will be understood by a person skilled in the art that lock handle 38 may be directly connected to spring 36 or may be connected by any other means known in the art.

Referring to FIG. 1, in the embodiment shown, a stop pin 42 is provided to prevent a user from overextending stretch connector 27 as it limits the distance between first wheel chock 14 and second wheel chock 18 when in the open position. Stop pin 42 may also be used to help guide lock pin 32 into lock pin aperture 34. To act as a guide to help lock pin 32 slide into lock pin aperture 34, stop pin 42 should be positioned such that contact between lock pin 32 and stop pin 42 places lock pin 32 in alignment to slide into lock pin aperture 34.

Figure 4:
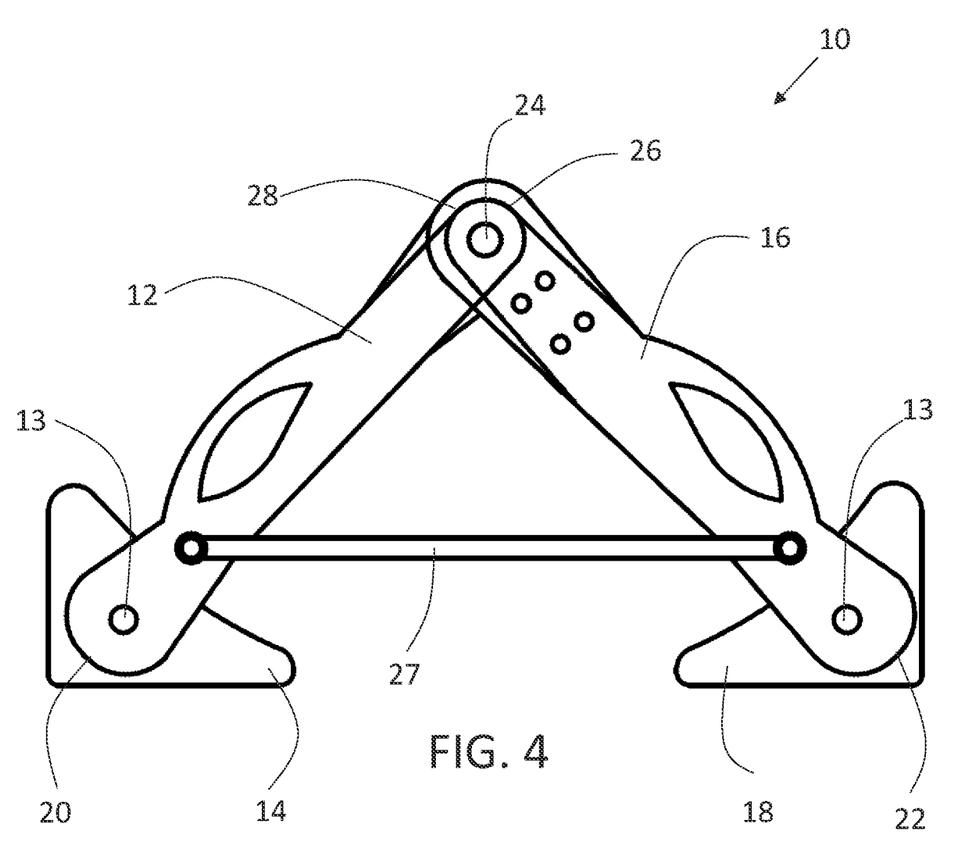
FIG. 4 is front elevation view of the positive pressure wheel chock without extending handles.

Referring to FIG. 1 through FIG. 3, in the embodiments shown, first arm 12 has a first handle 44 that extends from second end 26 of first arm 12. Second arm 16 has a second handle 46 that extends from second end 28 of second arm 16. This makes it possible for chock system 10 to be utilized without requiring the user to bend over. As can be seen in FIG. 4, handles extending from second end 26 of first arm 12 and second end 28 of second arm 16 are not required in all situations and the length of first arm 12 and second arm 16 can vary.

Figure 7:
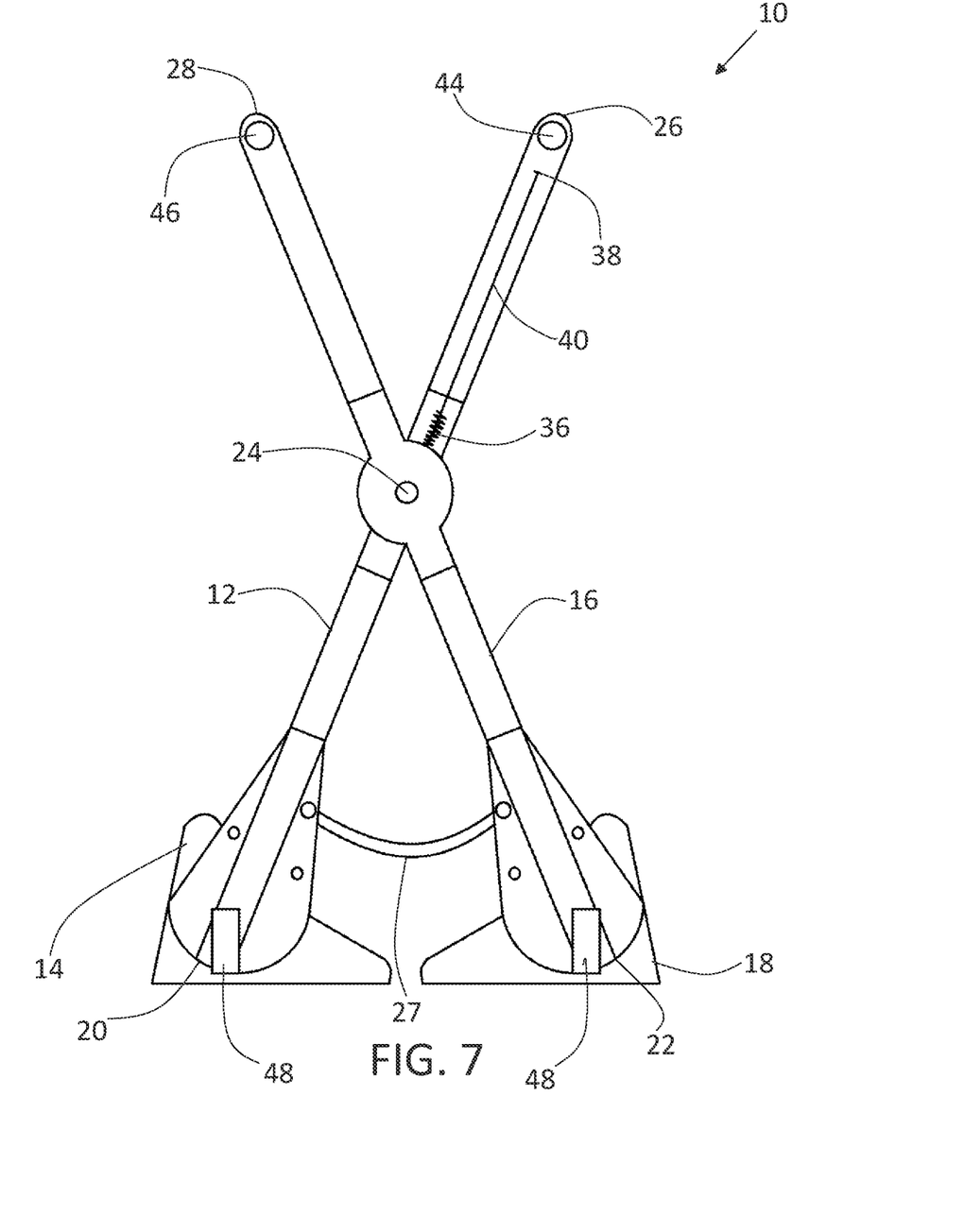
FIG. 7 is a front elevation view of the positive pressure wheel chock with trolley wheels.
Figure 8:
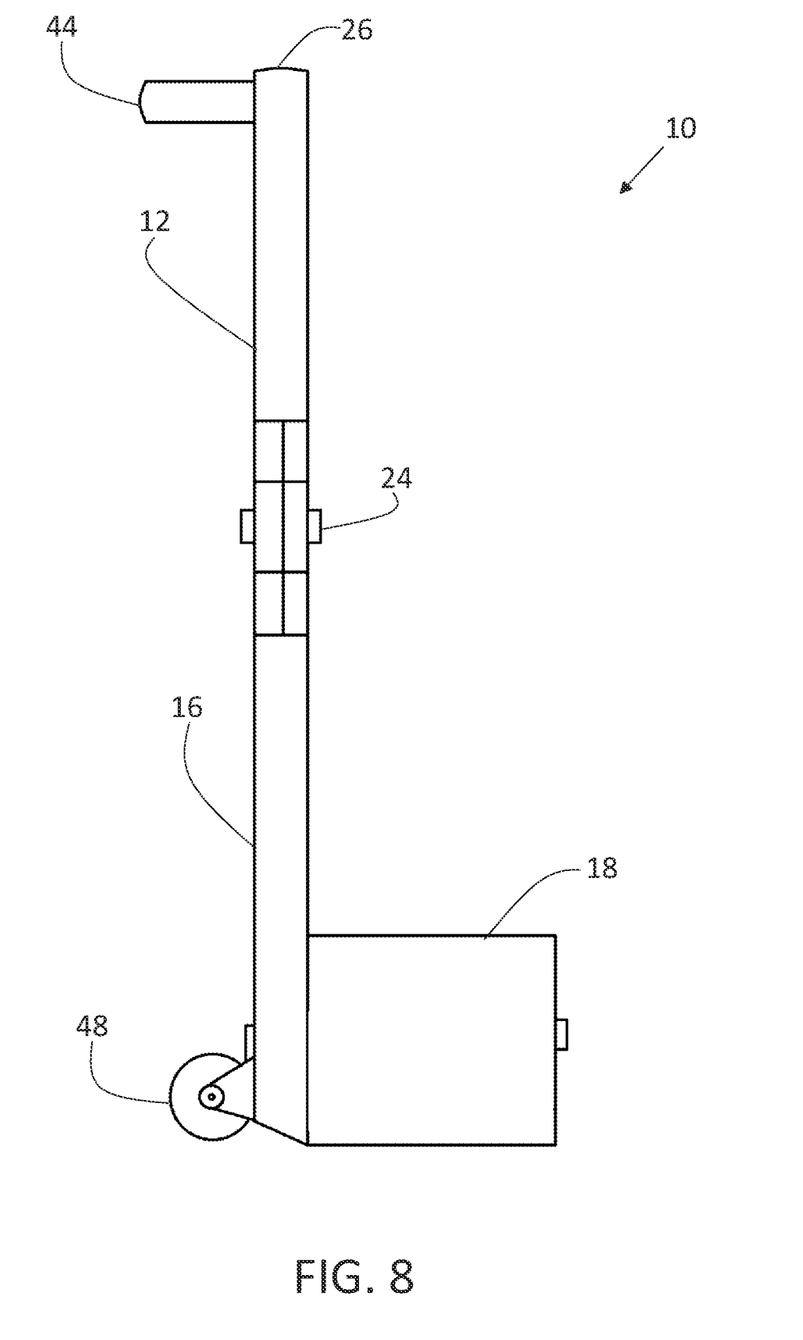
FIG. 8 is a side elevation view of the positive pressure wheel chock with trolley wheels.

Referring to FIG. 7 and FIG. 8, wheels 48 may be attached to first arm 12 and second arm 14 or first wheel chock 14 and second wheel chock 18 to aid in movement of positive pressure chock system 10. It will be understood by a person skilled in the art that caster wheels, trolley wheels, or any other suitable type of wheel may be used. The use of wheels 48 allow positive pressure chock system 10 to be pushed around like a trolley. This alleviates the need to carry or drag chock system 10 and helps to prevent damage caused by dropping and scraping. In the embodiment shown, wheels 48 are positioned on bottom ends 20 and 22 of first arm 12 and second arm 16, respectively.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A positive pressure chock system, comprising:
a first arm having a first wheel chock, the first wheel chock being attached at a bottom end of the first arm;
a second arm having a second wheel chock, the second wheel chock being attached at a bottom end of the second arm; and
the first arm and the second arm being attached at a hinge point such that the first wheel chock and the second wheel chock are movable between an open position where the first wheel chock and the second wheel chock move away from each other and a closed position wherein the first wheel chock is biased towards the second wheel chock; and
the first wheel chock being biased towards the second wheel chock by a stretch connector attached to the first arm and the second arm such that the first wheel chock exerts a pulling pressure on the second wheel chock when in the open position.

2. The positive pressure chock system of claim 1 wherein the first arm and the second arm extend beyond the hinge point such that a second end of the first arm and a second end of the second arm are positioned above the hinge point.

3. The positive pressure chock system of claim 2 wherein a locking mechanism is provided for holding the first wheel chock and the second wheel chock in the open position.

4. The positive pressure chock system of claim 3 wherein the locking mechanism comprises a lock pin and a lock pin aperture, the lock pin aperture having a size corresponding to a size of the lock pin, the lock pin aperture being positioned on one of the first arm or the second arm and the lock pin being positioned on the other of the first arm or the second arm such that the lock pin and the lock pin aperture are aligned when the first wheel chock and the second wheel chock are in the open position.

5. The positive pressure chock system of claim 4 wherein the lock pin is biased towards a locking position by a spring, the lock pin being movable to the unlocking position by a lock handle.

6. The positive pressure chock system of claim 5 wherein the lock handle is attached to the lock pin by a lock pin rod.

7. The positive pressure chock system of claim 4 wherein the lock pin aperture and the lock pin are positioned adjacent the hinge point.

8. The positive pressure chock system of claim 1 wherein a stop pin is provided to limit the distance between the first wheel chock and the second wheel chock when in the open position.

9. The positive pressure chock system of claim 1 wherein the first arm has a first handle, the first handle extending from a second end of the first arm.

10. The positive pressure chock system of claim 9 wherein the second arm has a second handle, the second handle extending from a second end of the second arm.

11. The positive pressure chock system of claim 1 wherein the stretch connector is surgical tubing.

12. The positive pressure chock system of claim 1 wherein the stretch connector is a rubber band.

13. The positive pressure chock system of claim 1 wherein the stretch connecter is a metal spring.

14. The positive pressure chock system of claim 1 wherein at least one wheel chock position pin is positioned adjacent to the first wheel chock to limit rotational movement of the first wheel chock relative to the first arm.

15. The positive pressure chock system of claim 14 wherein at least one wheel chock position pin is positioned adjacent to the second wheel chock to limit rotational movement of the second wheel chock relative to the second arm.

16. The positive pressure chock system of claim 1 wherein a first wheel is positioned adjacent the bottom end of the first arm and a second wheel is positioned adjacent the bottom end of the second arm to aid in transport of the positive pressure chock system.

\* \* \* \* \*